Patented July 11, 1950

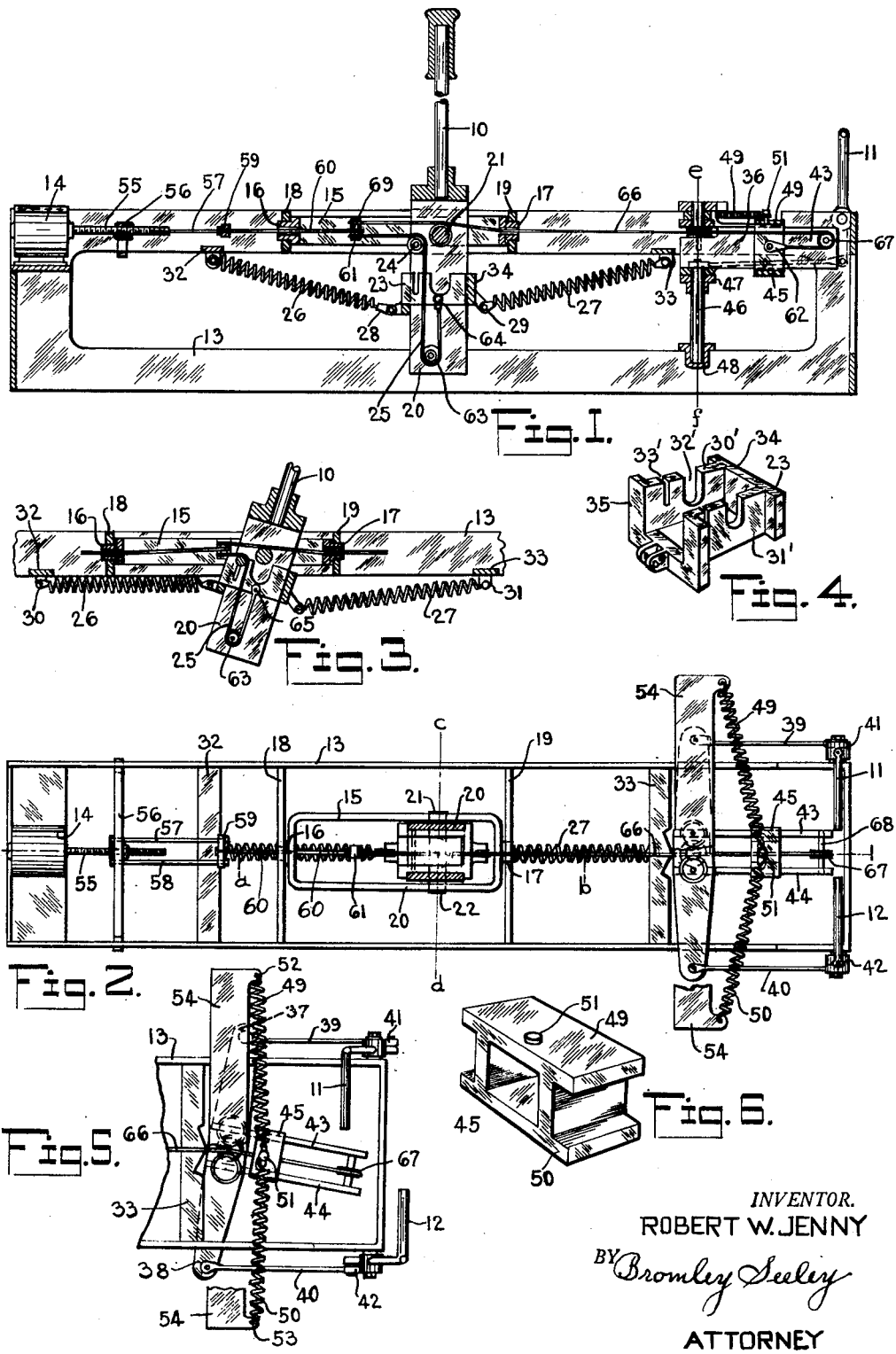

2,514,606

UNITED STATES PATENT OFFICE 2,514,606

TRAINER CONTROL LOADING DEVICE

Robert W. Jenny, East Paterson, N. J., assignor to Curtiss-Wright Corporation, Bloomfield, N. J., a corporation of Delaware Application August 1, 1945, Serial No. 608,200

4 Claims. (Cl. 35—12)

The invention relates to an improvement in apparatus for acquainting student pilots with the response of aircraft to its controls and particularly with the control reaction generally known as control loading.

There is only a slight restraint on the freedom of movement of the different manual controls in an actual airplane when its air speed is low and the restraint disappears as the speed approaches zero. On the other hand the controls of airplanes become more and more difficult to actuate with increasing speed due to the increase in air resistance imposed on the ailerons, rudders, elevators and like movable parts exposed to the air currents.

It is an object of the present disclosure to provide a simple and improved form of device constructed and arranged to impose on one or more of the simulated aircraft controls of an aircraft trainer such a degree of resistance to the manually imposed movement as will approximately correspond in its intensity of resistance to what the student would have to operate against if in an airplane actually flying at any assumed speed.

The invention discloses in combination with the usual trainer controls simulating the real controls and which include work arm levers, an arrangement of balancing springs engaging the levers in spaced relation to the fulcrum and disposed so as to be in balanced relation, that is in position not to impose any load on the control when the same is in its nrmal zero position, but which will impose a load gradually increasing in magnitude with increase in displacement of the control from its zero position and gradually increasing in magnitude with increase in the assumed speed.

Broadly the present invention features motor controlled means for shifting the point at which the springs act on the levers relative to the axis of turn of the controls and thus by varying the leverage arms through which the springs operate to vary the intensity of pull of the springs. In trainers of this type it is known to utilize a speed indicator operated by an air speed indicator motor for visually indicating to the operator the speed at which he is assumed to be moving. In the instant case the motor is utilized to impose a speed factor on the operation of the balancing springs, that is a shifting of the point of application of power by the springs on the controls so that with increase in simulated speed there will be an increase in the load imposed on the control or controls as it or they move away from its or their zero or non-load position. The stick load varies with the air speed squared. This mechanism inherently provides the "squaring" so the motor may be operated directly with change in air speed instead of with air speed squared.

More specifically described the invention features means controlled by said motor for varying the leverage or work arm through which power is applied to the controls at different assumed air speeds. As the stick load varies with the air speed squared, the spring load adjusting means herein disclosed provides for the squaring so that the motor may be operated with direct change of air speed and without necessity of the motor squaring the speed. In this way high costs of variable electric mechanism is avoided.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

In the accompanying drawings:

Fig. 1 is a longitudinal sectional view taken through a preferred embodiment of the invention and taken on the line 1—1 of Fig. 2 showing the parts in a simulated cruising position;

Fig. 2 is a plan view looking down upon the showing in Fig. 1;

Fig. 3 is a detail view in side elevation of the control stick of the preceding figures shifted into position to simulate a forward dive and at an increase in assumed air speed;

Fig. 4 is a detail perspective view of the slider on the stick of the preceding figures;

Fig. 5 is a detail view in plan of the rudder control of Figs. 1 and 2 shifted into position to simulate a bank to the right and at a decrease in assumed air speed, and Fig. 6 is a detail perspective view of the slider on the rudder controls.

In the drawings and referring first to Figs. 1-3 there is disclosed a stick 10 simulating the conventional aileron-elevator control of aircraft and pedals 11 and 12 simulating a conventional rudder control of aircraft all mounted on a support 13 which may be let into the floor of the trainer cockpit. The complete trainer includes a simulated air speed indicator (not shown) calibrated in terms of air speed units and controlled by an air speed indicator motor 14 in turn controlled by rheostats, switches and like circuit completed parts actuated by the simulated stick 10, rudder bars 11 and 12 and other student controlled parts not particularly involved in this disclosure.

For instance the stick 10 functions through connections not herein shown when shifted from its normal upright or zero position shown in Fig. 1 to simulate airplane control actions such, for example, as a back pressure on the stick 10 for simulating climb causes a resetting of the motor 14 and a reduction in the air speed indicator reading. Forward pressure on the stick 10 as shown in Fig. 3 simulates diving and causes a resetting of the motor 14 to turn its shaft in the opposite direction and a corresponding increase in air speed indicator reading. Likewise, lateral shifting of the stick 10 and shifting of the pedals 11—12 for simulating banking and turning adjusts the setting of the motor 14 and a corresponding resetting of the air speed indicator and of other instruments forming part of the complete training machine.

The mounting for the stick 10 permits universal articulation and includes a gimbal ring 15 of rectangular form having oppositely extending tubular trunnions 16 and 17 projecting forwardly and rearwardly therefrom and journalled respectively in bearings found in a pair of cross plates 18 and 19 forming part of the support 13 and disposed for rotation about a front to rear axis $a$—$b$. The lower end of the stick forms a long inverted U-shaped yoke 20 journalled in the ring 15 and mounted on pins 21—22 for rotation about a transverse axis $c$—$d$ at right angles to the axis $a$—$b$.

The two sides of the yoke provide a guide between which is mounted a rugged block 23 separately shown in Fig. 4 and hereinafter sometimes referred to as a stick loading point slider. Also mounted for free rotary movement between the sides of the yoke is an upstanding pulley 24 about which is trained a cable 25. The pulley is placed in the vertical plane containing the axis $a$—$b$ and is disposed so that the point of the cable with the pulley is located as close as possible to the intersection of the axes of the roll and pitch stick movements indicated respectively by the axis $a$—$b$ and $c$—$d$.

A pair of balancing springs 26 and 27 of the coiled type are disposed in the vertical plane containing the axis $a$—$b$ and extend forwardly and rearwardly from the slider 23. The adjacent ends 28—29 of the spring are secured to the slider to move vertically therewith and the other ends 30 and 31 of the springs are secured respectively to cross plates 32 and 33 of the support 13 and thus are fixed in space.

The slider 23 is of box-like form and includes two interior plates 30' and 31' each provided centrally thereof with a deep recess 32' and a narrower recess 33' for receiving respectively the pins 21—22 and the axle of the pulley 24 in those cases where the slider is shifted upwardly higher than is shown in Fig. 3. The slider also includes front and rear plates 34 and 35 lapping respectively the front and rear edges of the yoke 20 and forming channel-like members for receiving the yoke arms.

The simulated rudder pedals 11 and 12 are mounted forwardly of the stick 10 and between the pedals and stick is a turntable 36 mounted for rotation about a vertical axis $e$—$f$ normal to and intersecting the axis $a$—$b$. The table is somewhat T-shaped in plan and includes a head portion formed of a pair of laterally extending arms 37 and 38 connected respectively by links 39 and 40 with rocking arms 41 and 42 depending from the pedals 11 and 12. The stem portion of the T-shaped turntable is provided with guiding tracks in the form of two upstanding parallel plates 43 and 44 extending from front to rear and on which is slidably mounted a simulated rudder bar loading point slider 45. The turntable is journalled for rotary movement about the axis $e$—$f$ on a king pin 46 journalled in supports 47 and 48 formed on the support 13.

The slider 45 is of H-form as shown in Fig. 6 and includes a top plate 49 overlapping the plates 43—44 and a bottom plate 50 underlapping these plates and forming at opposite sides channels for receiving the two guide plates.

A pair of balancing springs 49 and 50 of the coiled type are disposed in a horizontal plane and extend forwardly and respectively left and right from the slider 45 as best shown in Figs. 2 and 5. The adjacent ends of the springs are secured to the slider by means of a stud 51 and the ends are arranged to move therewith in a general front to rear direction and their outer ends 52 and 53 are fixedly secured to the opposite ends of a cross strip 54 forming a fixed part of the support 13.

The motor 14 is provided with a threaded shaft 55 on which rides a running nut 56 in the form of a long bar extending transversely of the supporting frame 12 and held thereby from rotation. A pair of parallel reach bars 57—58 are secured at their rear ends to the running nut and are connected at their forward ends by a shiftable cross bar 59. A connecting rigid reach bar 60 extends from the cross bar 59, through the bore of the trunnion 16 and is secured at its opposite end to a floating connector 61. The flexible cable 25 extending from the connector is passed over and downwardly about the pulley 24; is passed under and upwardly about a pulley 63 journalled in the lower portion of the yoke 20 and has its upper free end 64 secured to the slider 23 by means of a bar 65 extending between the wall plates 30—31. A second cable 66 has its forward end 62 secured to the slider 45, is passed forwardly and upwardly about a pulley 67 carried by pin 68 mounted between the plates 43 and 44, is passed rearwardly therefrom through the trunnion 17, and has its rear end 69 secured to the connector 61 at a point between the pulley 24 and the rear side of the ring 15. In this way a movement of the motor controlled runner nut and associated reach bars 57—58 in one direction, say to the right of the showing in Fig. 1 will cause slider 23 to be elevated towards its Fig. 3 position, and the slider 45 to move from right to left or rearwardly towards the Fig. 5 position. A movement of the running nut 56 from right to left, that is in the opposite direction, will permit the slider 23 to be lowered and the slider 45 to move outwardly towards the right.

In operation and referring first to the operation as influenced by the stick 10, and assuming the motor 14 to be idle for simulating zero or constant air speed and thus the slider 23 fixed in its spaced relation to the axes of articulation of the stick, it will be seen that the springs 26 and 27 while even under very light load act to hold the stick upright in its normal zero position. In the event the stick is shifted in any direction from its zero position the spring which thus becomes elongated acts to resist this shifting operating through a work arm measured by the distance between the slider 23 and the plane which contains the axis of the trunnions 16—17 and the pivot pins 21—22. To this extent the instant disclosure functions generally as does the resetting springs in conventional forms of airplane stick controls.

The distinctive feature of the present disclosure is that means are provided such as the motor 14 to shift the slider 23 up or down from the position shown in Fig. 1 and thus vary the leverage distance at which its associated springs apply a load on the stick. The motor 14 thus controls the degree of manual load necessary to displace the stick 10 from its zero position by pulling the cable 25 in or out against a component of the load in the springs. For instance, assume an increase in simulated air speed with a resulting turning of the motor shaft over a few revolutions to cause a right to left shifting of the nut 56. This pulls on slider 23 against the resistance of the springs 26—27 and causes the slider to assume a lower position on the yoke 20 and thus an increase in the lever length between the new position of the inner ends of the springs 26—27 and the plane containing the axis of rotation of the stick with a resulting change in the spring rate of the loading system. This means that the springs react over a longer work arm than before, and thus with an increase in leverage effect, so that a greater manual force must be exerted on the stick to move the same than would be necessary under lower simulated air speed conditions.

For another example, assume a reduction in simulated air speed approaching a stalling position, then the motor shaft will turn a few revolutions in the opposite direction to cause a left to right shifting of the nut 56. This releases the tension on cable 25 permitting the springs 26—27 to draw on the slider and lift it into or towards the elevated position shown in Fig. 3 or even further upward beyond this position. This means that the springs react over a shorter work arm than before, again measured by the distance between the axis of pins 21—22 and the point of application of spring load. The distance is relatively short as viewed in Fig. 3 and would of course practically reach zero when the slider reached its point of maximum elevation with the pins 21—22 received in the slots 32. It is thus seen that as the slider is elevated toward its limiting position a less and less manual force need be exerted on the stick than was necessary when the slider was more remotely located relative to the axis of turn of the stick.

Similarly and with reference to the operation as influenced by simulated rudder control, and assuming that a foot pressure on the pedals 11 and 12 has caused the bar formed by the arms 37 and 38 to assume an angled position as shown in Fig. 5, this will react on the turntable 36 to similarly cause it to assume an angled position rotating slightly about its axis e—f. The springs 49 and 50 will resist this turning of the turntable with a force proportionate to the distance between the axis of turn e—f and the point at which the inner ends of the springs 49—50 engage the slider 45. As the cable 66 attached to this slider 45 is likewise attached to and partakes of the movement of the cable 25, it will be seen that the slider 45 will be shifted relative to the axis a—b, to the same extent that the slider 23 is similarly shifted relative to the axes of articulation of the stick 10. This means that at increased simulated air speed there is a corresponding increase in intensity with which the springs 49 and 50 resist the foot imposed load, and on the contrary as the simulated air speed decreases towards zero the spring load on the simulated controls, either stick or rudder pedals, are correspondingly decreased to zero load.

It is also appreciated that a shifting of one end of the spring while the other end is held fixed will change the length and thus vary the effective pull of the spring. For instance the length of the springs 26 and 27 is longer in Fig. 1 than in Fig. 3 and thus the springs in the Fig. 1 position exert a greater pull on the stick than in the Fig. 3 position. In this way the displacement of the inner ends of the springs outwardly increases the manual force necessary to displace the stick 10 both by virtue of the longer lever arm as well as by virtue of the use of stronger springs. It is within the scope of the disclosure to so select the type and size of springs used so that, with say a single rotation of the motor, the inner end of the springs move a unit distance to impose a unit increment of additional load, each spring would by reason of its increased length impose the same unit increment of additional load. In this way each rotation of the motor would improve on the stick a resistance to movement which would be the square of such unit increment of additional load.

By means of a device of the character disclosed it is possible to simulate zero stick load conditions with no slack in the interconnected parts giving indication of a smooth continuous loading with increase in speed and the retention of zero load at neutral stick position at all speeds. Due to the disposition of the springs, the method of moving the slider herein featured, and the fact that stick load is varied by location of the point of application of the load instead of proportionally stretching the springs, the system is operable with less power from the motor than would be the case if the motor had to pull against the full spring load.

I claim:

1. In a grounded machine for training aviators, the combination of a stick mounted for universal articulation and simulating a similar form of aileron-rudder control on an airplane, a rudder pedal simulating the rudder pedal of an airplane, a turntable located between the stick and rudder pedal and operatively connected to be turned thereby, a slider mounted on the turntable for front to rear movement along a line intersecting the axis of rotation of the turntable, a pair of balancing springs normally under tension having their adjacent ends secured to the slider to move therewith, extending outwardly in a general lateral direction therefrom and having their outer ends fixed in space and disposed when the turntable is turned to increase the tension on one of the springs while releasing the tension on its companion, a second slider mounted on the stick for vertical movement to and from its axis of articulated movement, a second pair of balancing springs extending in a general forward-rearward direction and disposed when the stick is shifted in any direction from normal to increase tension on one of the springs while decreasing tension on its companion, said second pair of springs having their adjacent ends secured to the second slider to move therewith and having their other ends secured in space, a motor having a threaded shaft extending in a forward direction therefrom, a runner nut on the shaft, flexible means extending from the nut to the second slider to control its relation to the axis of articulation of the stick and a second flexible means connecting the first named slider to the first named flexible means whereby the motor through the two sliders controls the leverage through which each spring acts on its associated stick and rudder pedal.

2. In a grounded machine for training aviators, the combination of a pair of manually actuated controls, one comprising a stick and the other a rudder control simulating corresponding controls of an airplane, two pairs of balanced springs, one pair associated with the stick and tending to maintain the same in its normal upright position and provided with a first tension control means for simultaneously adjusting the active length relation and angularly of each spring and the other pair associated with the rudder control, tending to maintain the same in its normal position and provided with a second tension control means for simultaneously adjusting the active length relation and angularity of each rudder controlling spring and a single control operatively connected to both the first and second control means for simultaneously adjusting the tension on all four springs and for shifting their point of application of power relative to the stick and rudder control respectively.

3. The device defined in claim 2 and in which the single control includes an electric motor, a threaded shaft turned thereby, a runner nut on the shaft and a flexible connection between the runner nut and the point at which each pair of springs engage its associated stick and rudder control relative to their associated axes of rotation.

4. In a grounded training machine for aviators, the combination of a manually operable training control simulating a similar form of control on an airplane and which control on the airplane is subjected to air stream forces of variable intensity which tend to resist the manually applied force necessary to shift the airplane control, said training control mounted for rocking movement, mechanical means including springs for imposing on the training control a resistance to its otherwise freedom of movement and means for varying the point of application of force of said resistance relative to the axis of rocking movement to vary the operative leverage through which the springs operate on the control and thus to simulate on the trainer control the effects of the variable air stream forces which tend to resist the movement of the airplane control.

ROBERT W. JENNY.

REFERENCES CITED

The following references are of record in the file of this patent:

UNITED STATES PATENTS

| Number | Name | Date |
| --- | --- | --- |
| 856,888 | Laflin | June 11, 1907 |
| 1,314,678 | Long | Sept. 2, 1919 |
| 1,455,447 | Ochs | May 15, 1923 |
| 2,205,610 | Van Ness | June 25, 1940 |
| 2,276,702 | Riparbelli | Mar. 17, 1942 |
| 2,409,938 | Hutter | Oct. 22, 1946 |
| 2,316,181 | Ocker | Apr. 13, 1943 |
| 2,336,711 | Barber | Dec. 14, 1943 |
| 2,338,379 | Henke | Jan. 4, 1944 |
| 2,341,253 | West | Feb. 8, 1944 |
| 2,385,095 | McCarthy | Sept. 18, 1945 |

FOREIGN PATENTS

| Number | Country | Date |
| --- | --- | --- |
| 158,522 | Great Britain | 1918 |